US012649383B2

(12) United States Patent
Jang et al.

(10) Patent No.: US 12,649,383 B2
(45) Date of Patent: Jun. 9, 2026

(54) SYSTEM AND METHOD FOR DIAGNOSING VEHICLE BATTERY BY USING BIG DATA

(71) Applicants: Hyundai Motor Company, Seoul (KR); Kia Corporation, Seoul (KR)

(72) Inventors: Hyun Jun Jang, Daegu (KR); Byung Soo Park, Daejeon (KR); Woo Sung Kim, Suwon-Si (KR); Jae Shin Yi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 578 days.

(21) Appl. No.: 17/987,950

(22) Filed: Nov. 16, 2022

(65) Prior Publication Data

US 2023/0356624 A1 Nov. 9, 2023

(30) Foreign Application Priority Data

May 9, 2022 (KR) ........................ 10-2022-0056574

(51) Int. Cl.
*B60L 58/16* (2019.01)
*B60L 58/25* (2019.01)
(52) U.S. Cl.
CPC ............... *B60L 58/16* (2019.02); *B60L 58/25* (2019.02)

(58) Field of Classification Search
CPC .......... B60L 58/16; B60L 58/25; B60L 58/24; B60L 58/10; B60L 2240/545; B60L 3/0046
USPC ........................................................... 701/22
See application file for complete search history.

(56) References Cited

U.S. PATENT DOCUMENTS

| | | | | |
|---|---|---|---|---|
| 2016/0276855 A1* | 9/2016 | Lian | ..................... | H01M 50/249 |
| 2020/0164763 A1* | 5/2020 | Holme | ..................... | B60L 58/16 |
| 2022/0302519 A1* | 9/2022 | Tsuruta | .............. | H01M 10/635 |
| 2024/0241180 A1* | 7/2024 | Lee | ........................ | G01R 31/367 |
| 2025/0042299 A1* | 2/2025 | Matsuda | ............. | H01M 50/249 |

* cited by examiner

*Primary Examiner* — Helal A Algahaim
*Assistant Examiner* — John D Holman
(74) *Attorney, Agent, or Firm* — Banner & Witcoff, Ltd.

(57) ABSTRACT

Proposed are system and method for diagnosing a vehicle battery by using big data. Battery-related data may be collected through communication from multiple vehicles. A reference battery temperature distribution for each driving condition may be derived by a learning process based on the battery-related big data. The derived reference battery temperature distribution may be used to analyze a current battery temperature distribution of a specific vehicle so as to diagnose whether the battery of the specific vehicle is abnormal.

17 Claims, 6 Drawing Sheets

SYSTEM AND METHOD FOR DIAGNOSING VEHICLE BATTERY BY USING BIG DATA

CROSS REFERENCE TO RELATED APPLICATION

The present application claims priority to Korean Patent Application No. 10-2022-0056574, filed on May 9, 2022, the entire contents of which are incorporated herein by reference for all purposes.

BACKGROUND

The present disclosure relates generally to system and method for diagnosing a vehicle battery. An eco-friendly vehicle such as a hybrid vehicle and an electric vehicle may be equipped with a battery as a driving power source.

Although a charging/discharging control method for the battery may be operated in the manner of controlling the charging and discharging of the battery by a current value preset according to the voltage and temperature of the battery, thermal safety incidents such as ignition of the battery while a vehicle is driving may occur.

Accordingly, battery safety diagnosis logic (e.g., logic for diagnosing and warning whether the battery is thermally safe) for ensuring the thermal safety of the battery may be implemented in a battery management system (BMS), which may be implemented as one of controllers mounted on the eco-friendly vehicle and perform overall management and control of the battery.

However, the battery safety diagnosis logic implemented in the BMS may be a formula-based battery safety diagnosis method based on battery status information and may be a passive system. Furthermore, the battery safety diagnosis logic may be a method configured based on equations, formulas, and several tests. As such, it may be difficult to precisely address the issues of the battery-related accident of a vehicle.

Further, since the electrochemical characteristics of the battery may be greatly affected by the temperature of the battery, it is desirable to accurately estimate the temperature of the battery in order to improve the accuracy of the battery safety diagnosis logic. However, the temperature of the battery changes depending on the amount of heat generated during charging of the battery, the temperature of a surrounding environment, and the state of the cooling system of the battery. For at least these reasons, it may be difficult to accurately estimate the temperature of the battery.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

In a system and method for diagnosing a vehicle battery by using big data, battery-related big data collected from mass-produced vehicles may be learned/trained (e.g., via a machine learning process, a deep learning process, etc.) to estimate the temperature distribution of a battery in a normal state, and the temperature distribution may be compared with the temperature distribution of a battery of a specific vehicle so as to diagnose whether the battery is abnormal.

A system may comprise: a server configured to derive a reference battery temperature distribution based on battery-related data received from a plurality of vehicles; and a controller configured to compare a battery temperature distribution received from a first vehicle with the reference battery temperature distribution and to transmit, based on a result of comparing the battery temperature distribution received from the first vehicle with the reference battery temperature distribution, an indication that a battery of the first vehicle is associated with a thermal abnormality.

The system may further comprise a communication device to receive the battery-related data from the plurality of vehicles. The server may be further configured to: extract, based on the battery-related big data, factors affecting a battery temperature in the plurality of vehicles; perform, based on the extracted factors, a learning process to determine which extracted factors affect the battery temperature for a plurality of actual driving conditions; and derive the reference battery temperature distribution for a normal battery state.

The system may further comprise a communication device to receive the battery temperature distribution from the first vehicle. The controller may be further configured to generate, based on the result of comparing the battery temperature distribution received from the first vehicle with the reference battery temperature distribution, a plurality of fault codes to indicate whether the battery of the first vehicle is thermally abnormal, and to transmit the plurality of fault codes to the first vehicle.

The controller may be further configured to identify, based on the result of comparing the battery temperature distribution received from the first vehicle with the reference battery temperature distribution, a thermally abnormal section of the battery of the first vehicle, and to generate, based on the thermally abnormal section, fault codes associated with a battery cell of the first vehicle.

Based on a temperature of the battery cell satisfying a first condition, the controller may be further configured to count a number of warning temperatures associated with the battery cell and a number of temperature sensor warning codes, and to generate a first flag as a fault code to indicate the thermal abnormality.

Based on a temperature of the battery cell satisfying a second condition, the controller may be further configured to count a number of fault temperatures associated with the battery cell and to generate, based on the number of fault temperatures satisfying a first threshold, a second flag as a fault code to indicate the thermal abnormality.

Based on a temperature of the battery cell satisfying a second condition, the controller may be further configured to count a number of fault temperatures associated with the battery cell and a number of temperature sensor fault codes associated with the battery cell, and to generate, based on the number of fault temperatures satisfying a second threshold and the number of temperature sensor fault codes satisfying a third threshold, a third flag as a fault code to indicate the thermal abnormality.

A method may comprise: receiving, by a computing device, battery-related data transmitted from a plurality of vehicles; determining, based on the battery-related data, a reference battery temperature distribution; receiving a battery temperature distribution of a battery of a first vehicle; comparing the battery temperature distribution of the battery of the first vehicle with the reference battery temperature distribution; generating, based on a result of the comparing the battery temperature distribution of the battery of the first vehicle with the reference battery temperature distribution, a fault code indicating whether the battery of the first vehicle is thermally abnormal; and transmitting the fault code to the first vehicle.

The method may further comprise: obtaining the reference battery temperature distribution by extracting, based on the battery-related data, factors affecting a battery temperature in the plurality of vehicles; and performing, based on the extracted factors, a learning process to determine which extracted factors affect the battery temperature for a plurality of actual driving condition.

The method may further comprise: generating, based on the result of the comparing the battery temperature distribution of the battery of the first vehicle with the reference battery temperature distribution, a plurality of fault codes for a battery cell of the first vehicle after identifying a thermally abnormal section of the battery of the first vehicle.

The method may further comprise: based on a temperature of the battery cell satisfying a first condition: counting a number of warning temperatures associated with the battery cell and a number of temperature sensor warning codes; and generating a first flag as a fault code to be transmitted to the first vehicle.

The method may further comprise: based on a temperature of the battery cell satisfying a second condition: counting a number of fault temperatures associated with the battery cell; and generating, based on the number of fault temperatures satisfying a first threshold, a second flag as a fault code to be transmitted to the first vehicle.

The method may further comprise: based on a temperature of the battery cell satisfying a second condition: counting a number of fault temperatures associated with the battery cell and a number of temperature sensor fault codes associated with the battery cell; and generating, based on the number of fault temperatures satisfying a second threshold and the number of temperature sensor fault codes satisfying a third threshold, a third flag as a fault code to be transmitted to the first vehicle.

These and other features and advantages are described in greater detail below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, various examples of the present disclosure will be described in detail with reference to the accompanying drawings.

Figure 1:
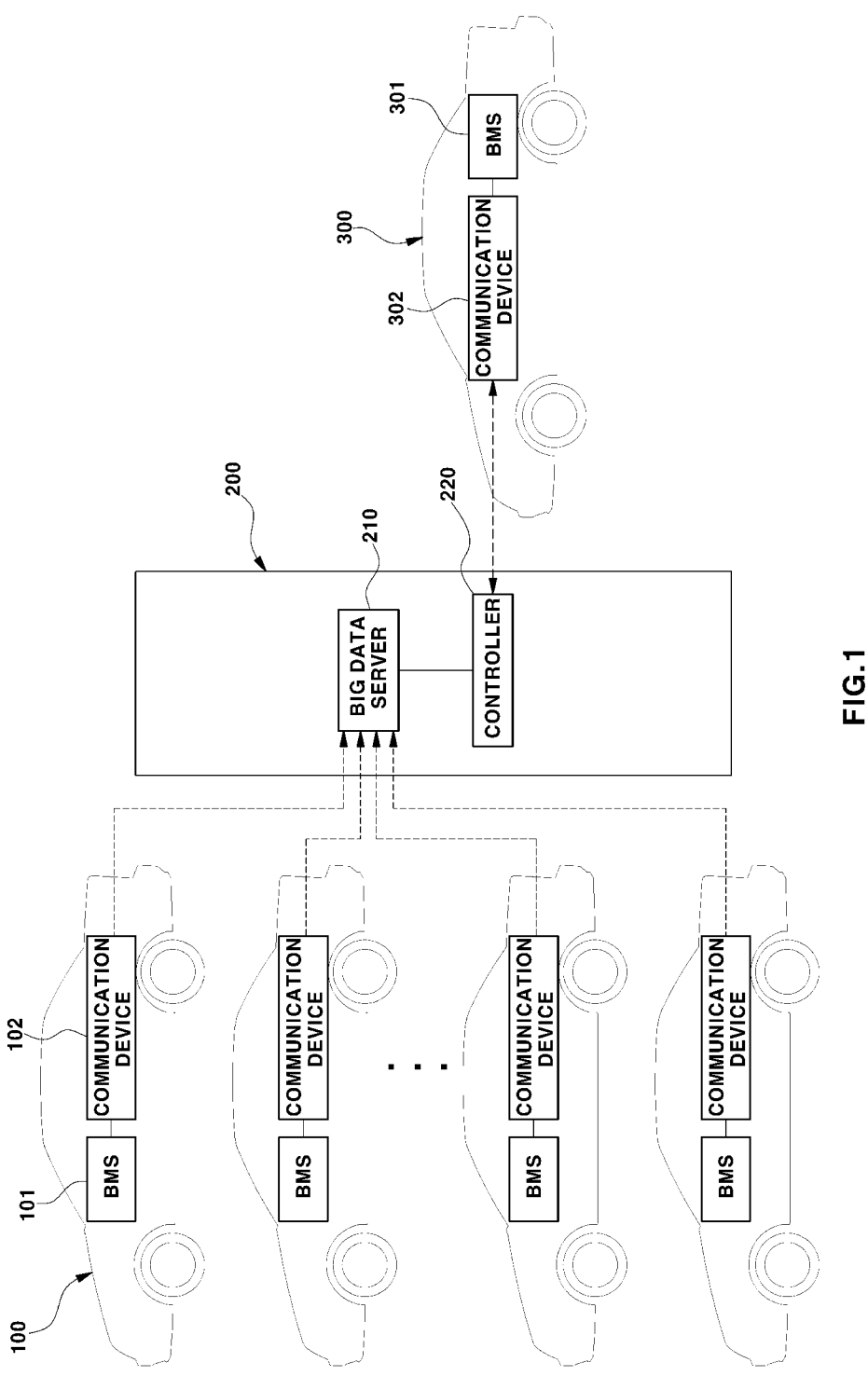
FIG. 1 is a diagram illustrating the configuration of a system for diagnosing a vehicle battery by using big data according to the present disclosure.

FIG. 1 is a diagram illustrating the configuration of a system for diagnosing a vehicle battery by using big data according to the present disclosure.

As illustrated in FIG. 1, the battery diagnostic system may include a cloud network 200 which may be communicatively connected to multiple vehicles 100 (e.g., vehicles produced by mass-production operations) and a specific vehicle 300 via a communication network (e.g., an internet network, a wired communication network, a wireless communication network, etc.) The cloud network 200 may include one or more servers (e.g., a big data server 210) and a controller 220.

The big data server 210 may be included in the cloud of a control center, which may communicate with communication devices 102 of the vehicles 100 via the communication network. The big data server 210 may include at least one processor which performs a learning process based on battery-related big data.

For example, the big data server 210 may collect the battery-related big data from the multiple vehicles 100 via the communication network, and determine/extract parameters and/or factors affecting a battery temperature from the collected battery-related big data. The big data server 210 may perform a learning process based on the extracted factors (e.g., such that the extracted factors affect a battery temperature for each actual driving condition so as to derive a reference battery temperature distribution of a battery in a normal state for the respective driving condition).

For example, the big data server 210 may collect battery-related data from the BMSs 101 of the multiple vehicles 100 via the communication devices 102, respectively, and may create a database forming big data by aggregating the collected battery-related data. The big data server 210 may extract parameters and/or factors affecting a battery temperature, such as a battery voltage, a current, a state of charge (SOC) of a battery, a state of health (SOH) of a battery, a coolant temperature for cooling a battery, an outside temperature (e.g., a temperature outside of a vehicle), and an revolutions per minute (RPM) of an electric pump to circulate a coolant from the collected battery-related data. The big data server 210 may perform a learning process based on the factors extracted by using a predetermined learning algorithm such that the parameters and/or factors affect a battery temperature for each actual driving condition so as to derive the reference battery temperature distribution of a battery in a normal state for the respective driving condition.

The learning process performed by the big data server 210 may include analyzing meaningful indicators from different types of data collected through various paths, and the learning process may be performed by one or more learning process algorithms (e.g., a time series data-based algorithm, a recurrent neural network (RNN)-based algorithm such as a long short-term Memory (LSTM) and a gated recurrent unit (GRU) based on the thermodynamic and electrochemical properties of the battery.

The controller 220 included in the cloud network 200 may compare a current battery temperature distribution received from the BMS 301 of the specific vehicle 300 with the reference battery temperature distribution derived from the big data server 210. The result of determination on whether the battery of a specific vehicle has thermal abnormality according to the result of the comparison may be transmitted to the BMS 301 of the specific vehicle 300.

For example, the controller 220 may receive the data of a battery temperature distribution (e.g., the current battery temperature distribution) of a specific vehicle via the communication device 302 from the BMS 301 of the specific vehicle 300 requesting one or more determinations (e.g., a determination on whether the battery of the specific vehicle is abnormal). The controller 220 may determine whether the battery of the specific vehicle is abnormal, for example, in response to the request from the specific vehicle 300. The controller 220 may compare the received battery temperature distribution with the reference battery temperature distribution derived from the big data server 210. The controller 220 may, according to the result of the comparison, determine whether the battery of the specific vehicle has thermal abnormality and may transmit the determined result to the BMS 301 of the specific vehicle 300.

For example, the controller 220 may compare the reference battery temperature distribution (e.g., associated with a plurality of vehicles 100) with the current battery temperature distribution of the specific vehicle 300, and determine that a battery mounted on the specific vehicle 300 has thermal abnormality, for example, if a difference between the reference battery temperature distribution and the current battery temperature distribution satisfies a threshold (e.g., a predetermined level or more). The controller 200 may classify the result of the determination into a plurality of categories (e.g., multiple fault codes, for example, at least three fault codes), and may transmit the determined results (e.g., the fault codes) to the BMS 301 of the specific vehicle 300.

If a difference between the reference battery temperature distribution and the current battery temperature distribution satisfies a threshold (e.g., a preset level or more), the controller 220 may determine that a battery mounted on a specific vehicle has thermal abnormality, and may determine the diagnosis result as abnormal (e.g., a fault). In order to classify and determine abnormality (e.g., faults) for diagnosis levels, the controller 220 may classify the abnormality (e.g., faults) into multiple abnormality levels or types (e.g., fault codes, for example, at least three fault codes), and may transmit at least one of the abnormality levels or types (e.g., the fault codes) to the BMS 301 of the specific vehicle 300.

Hereinafter, a method for diagnosing a vehicle battery by using big data by a system will be described in detail. The system may implement one or more features of the configuration described herein.

Figure 3:
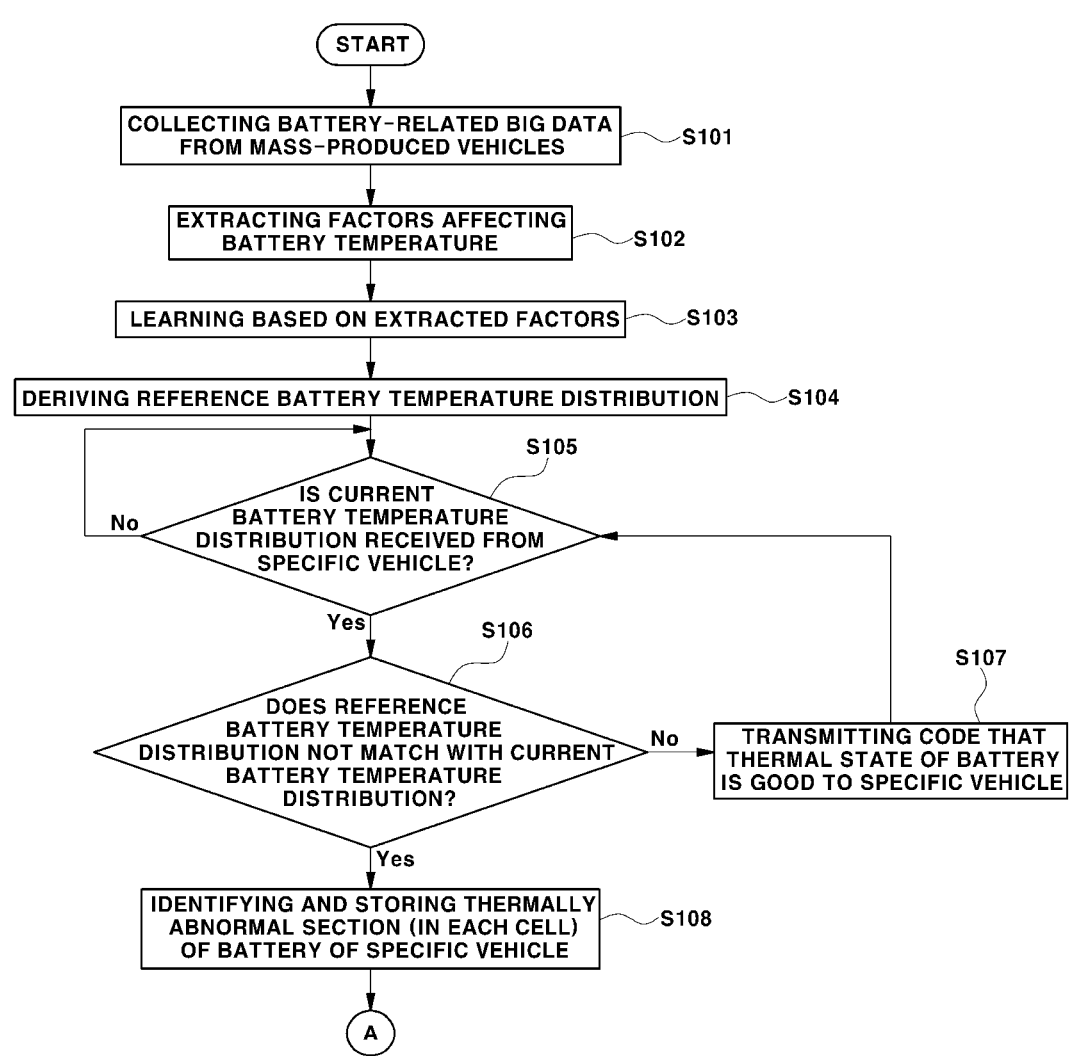
FIGS. 3, 4, and 5 are flowcharts sequentially illustrating a method for diagnosing the vehicle battery by using big data according to the present disclosure.
Figure 4:
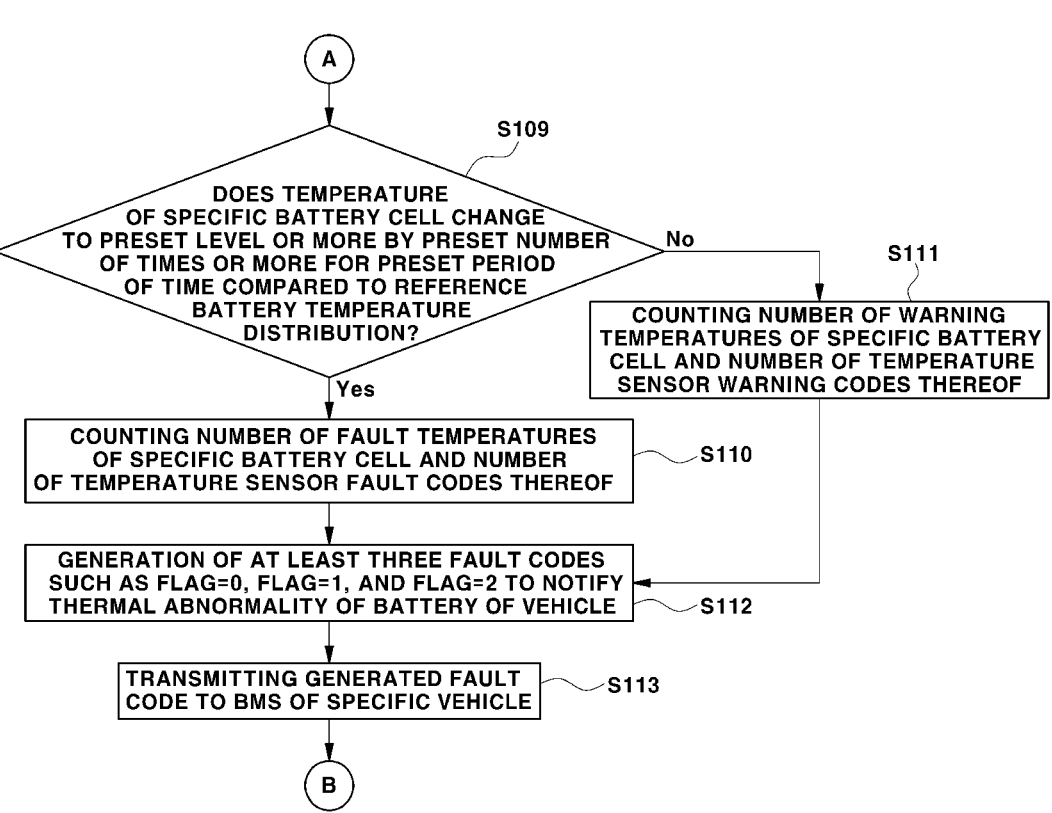
Figure 5:
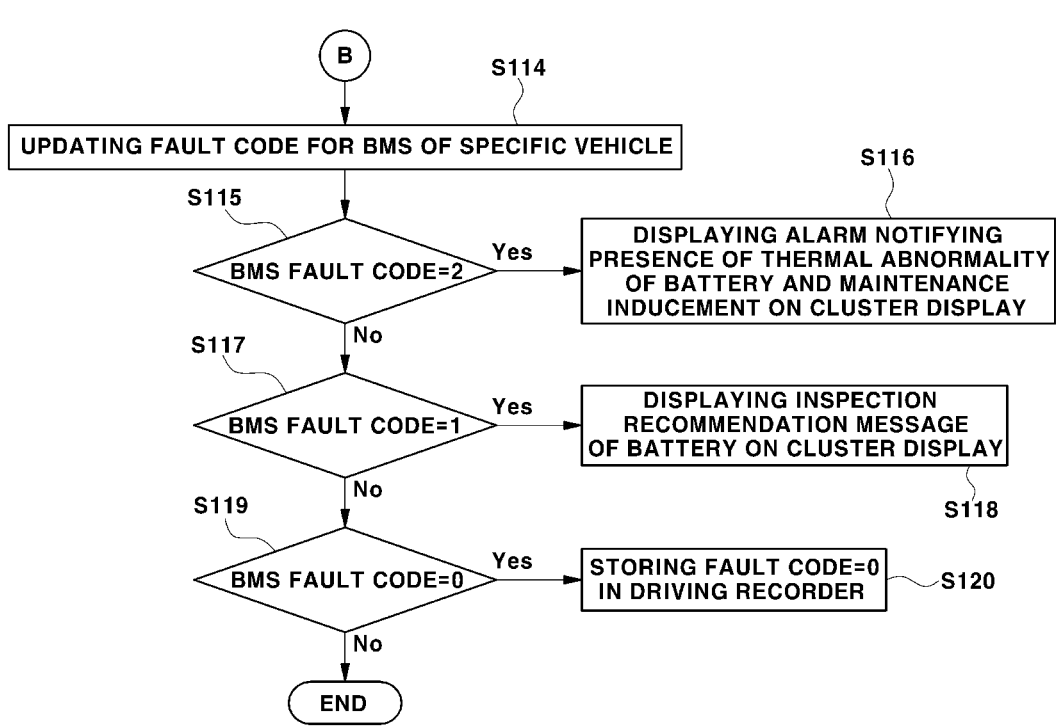

FIG. 3, FIG. 4, and FIG. 5 are flowcharts sequentially illustrating a method for diagnosing a vehicle battery by using big data according to the present disclosure.

The big data server 210 of the cloud network 200 may collect battery-related data from multiple vehicles 100 (e.g., at S101) and generate battery-related big data by aggregating the collected data and extracting one or more feature sets (e.g., the parameters and/or factors).

For example, the big data server 210 may collect the battery-related data transmitted via the communication devices 102 from the BMSs 101 of the multiple vehicles 100, and the battery-related data may include information of cell units of batteries mounted on the vehicles 100.

The big data server 210 may extract parameters and/or factors affecting a battery temperature from the battery-related data as described above (e.g., at S102).

For example, the big data server 210 may extract parameters and/or factors affecting a battery temperature, such as a battery voltage, a current, a state of charge (SOC) of a battery, a state of health (SOH) of a battery, a coolant temperature for cooling a battery, an outside temperature, and the RPM of an electric pump to circulate a coolant from the battery-related big data (and/or from the battery-related data received from the plurality of vehicles 100).

The big data server 210 may perform a learning process based on the extracted parameters and/or factors such that the extracted parameters and/or factors affect a battery temperature for each actual driving condition (e.g., at S103).

In an example, by using one or more algorithms (e.g., a time series data-based algorithm, a recurrent neural network (RNN)-based algorithm such as a long short-term Memory (LSTM) and a gated recurrent unit (GRU), etc.) based on the thermodynamic and electrochemical properties of the battery as described above, the big data server 210 may perform a learning process based on the extracted factors such that the extracted factors affect a battery temperature for each actual driving condition.

Accordingly, the reference battery temperature distribution of a battery in a normal state for each driving condition can be derived by the learning process of the big data server 210 (e.g., at S104).

Figure 2:
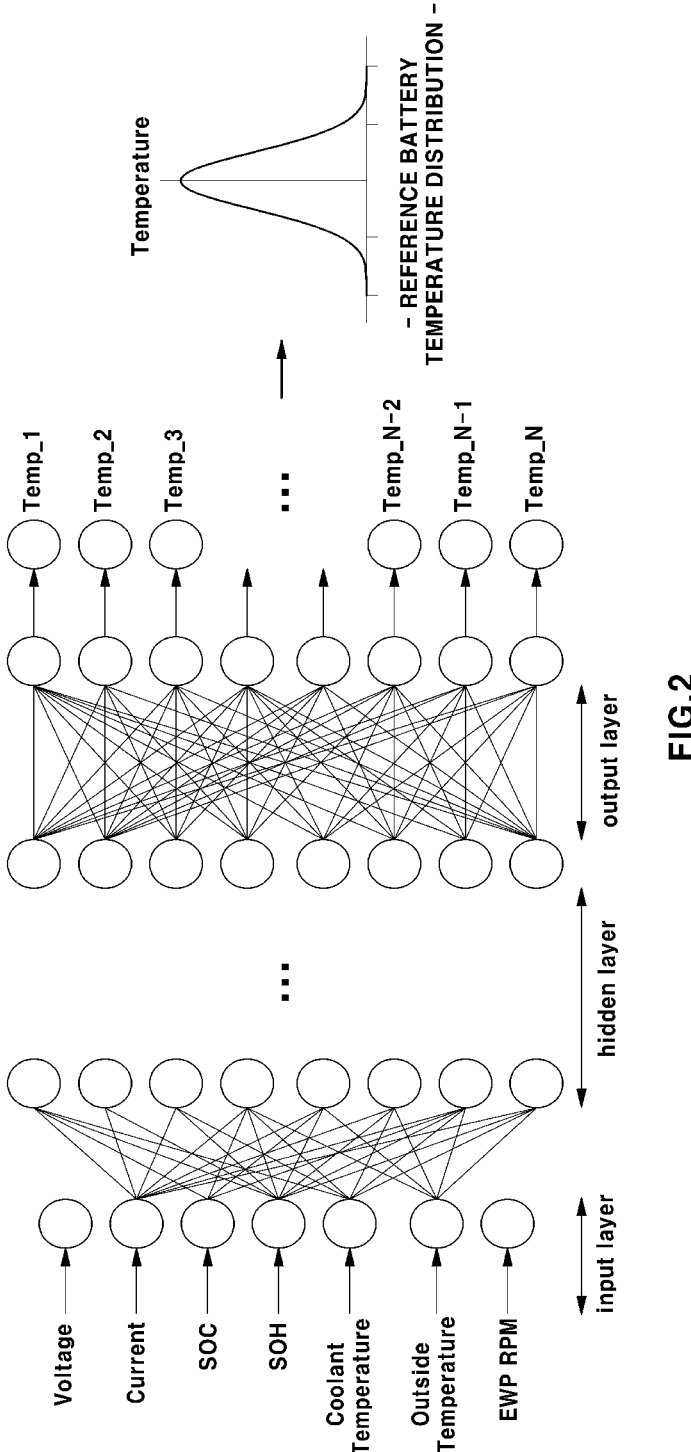
FIG. 2 is a schematic diagram illustrating an example in which a big data server extracts reference battery temperature data on the basis of factors affecting a battery temperature according to the present disclosure.

For example, as illustrated in FIG. 2, as extracted factors affecting a battery temperature, a plurality of parameters (e.g., a voltage, a current, the state of charge (SOC) of a battery, the state of health (SOH) of a battery, the coolant temperature for cooling a battery, an outside temperature, and the RPM of an electric pump to circulate a coolant) may be input to an input layer of the big data server 210, and a hidden layer of the big data server 210 may use an algorithm to perform a learning process based on the extracted factors such that the extracted factors affect a battery temperature for each actual driving condition, and a reference battery temperature distribution of a battery in a normal state for each driving condition derived by the learning process may be output through an output layer of the big data server 210.

The controller 220 may check/determine whether the current battery temperature distribution data of the specific vehicle 300 is received by the controller 220 (e.g., at S105).

The specific vehicle 300 and vehicles 100 may be the same (or different) type of vehicles equipped with batteries of the same specification.

If it is checked that the current battery temperature distribution data of the specific vehicle 300 is received by the controller 220 from the BMS 301 of the specific vehicle 300 via the communication device 302, the controller 220 may compare the received current battery temperature distribution with the reference battery temperature distribution derived from the big data server 210 (e.g., at S106).

As the result of the comparison, if it is determined that the reference battery temperature distribution and the current battery temperature distribution matches with each other by having only a difference less than a preset level therebetween, the controller 220 may transmit a code indicating that the thermal condition of the battery is normal to the BMS 301 of the specific vehicle 300 (e.g., at S107).

On the other hand, if it is determined that the reference battery temperature distribution and the current battery temperature distribution do not match with each other by having a temperature difference of a preset level or more therebetween, the controller 220 may generate one or more fault codes distinct from each other (e.g., at least three fault codes distinct from each other), and may transmit the one or more fault codes to the BMS 301 of the specific vehicle 300 (e.g., at S113).

In this case, if it is determined that the reference battery temperature distribution and the current battery temperature distribution do not match with each other by having a temperature difference of a preset level or more therebetween, the controller 220 may determine the diagnosis result of the determination as abnormal (e.g., a fault). In order to classify and determine faults for diagnosis levels, the controller 220 may classify the faults into multiple fault codes different from each other (e.g., at least three fault codes), and may transmit the fault codes to the BMS 301 of the specific vehicle 300.

For example, the controller 220 may compare the reference battery temperature distribution with the current battery temperature distribution, and determine that a battery mounted on a specific vehicle has thermal abnormality if a difference between the reference battery temperature distribution and the current battery temperature distribution is a preset level or more. The controller 220 may generate a plurality of fault codes (e.g., at least three fault codes distinct from each other such as Flag=0, Flag=1, and Flag=2), and may transmit the fault codes to the BMS 301 of the specific vehicle 300.

Hereinafter, an example of generating the at least three fault codes will be described.

If it is determined that the reference battery temperature distribution and the current battery temperature distribution do not match with each other by having a temperature difference of a preset level or more, the controller 220 may be configured to identify and store the thermally abnormal section of the battery of a specific vehicle in each battery cell in order to generate at least three fault codes and to generate the at least three fault codes for a stored specific battery cell.

Accordingly, as the result of the comparison at the step S106, if it is determined that the reference battery temperature distribution and the current battery temperature distribution do not match with each other by having the temperature difference of a predetermined level or more therebetween, the controller 220 may identify and store the thermally abnormal section of the battery of a specific vehicle in each battery cell in order to generate at least three fault codes (e.g., at S108).

The controller 220 may compare a current battery temperature distribution with the reference battery temperature distribution in each battery cell, and may identify a specific battery cell (for example, any one of multiple battery cells) whose temperature changes to a preset level or more, compared to the reference battery temperature distribution. The controller 220 may store information of the identified a specific battery cell.

The controller 220 may check whether the specific battery cell having the temperature change to a preset level or more (e.g., compared to the reference battery temperature distribution) may be determined to be thermally abnormal.

Based on a current battery temperature distribution (which may be updated by the BMS 301) transmitted from the BMS 301 of the specific vehicle 300, the controller 220 may check whether the temperature of the specific battery cell continues to change to a preset level or more by a preset number of times or more for a preset period of time (e.g., compared to the reference battery temperature distribution) (e.g., at S109).

As a result of the checking, if it is determined that the temperature of the specific battery cell changes to a preset level or more by a preset number of times or more for a preset period of time (e.g., compared to the reference battery temperature distribution), the controller 220 may count the number of fault temperatures of the specific battery cell and the number of temperature sensor fault codes thereof (e.g., at S110).

The number of fault temperatures of the specific battery cell may be obtained by counting the number of times equal to or more than the preset number of times by which the temperature of the specific battery cell changes to a preset level or more (e.g., compared to the reference battery temperature distribution). The temperature sensor fault code of the specific battery cell may be obtained by counting the number of times equal to or more than the preset number of times by which the temperature of the specific battery cell measured by the temperature sensor for a preset period of time changes to a preset level or more (e.g., compared the reference battery temperature distribution).

On the other hand, if it is determined that the temperature of the specific battery cell changes to a preset level or more by less than a preset number of times for a present period of time (e.g., compared to the reference battery temperature distribution), the controller 220 may count the number of the warning temperatures of the specific battery cell and the number of the temperature sensor warning codes of the specific battery cell (e.g., at S111).

In this case, the number of the warning temperatures of the specific battery cell may be obtained by counting the number of times less than the preset number of times by which the temperature of the specific battery cell changes to a preset level or more (e.g., compared to the reference battery temperature distribution). The number of the temperature sensor warning codes of the specific battery cell may be obtained by counting the number of times less than the preset number of times by which the temperature of the specific battery cell measured by a temperature sensor for a present period of time changes to a preset level or more (e.g., compared to the reference battery temperature distribution).

Based on the number of fault temperatures of the specific battery cell and the number of temperature sensor fault codes thereof, or based on the number of the warning temperatures of the specific battery cell and the number of the temperature sensor warning codes thereof which are counted by the controller 220, the controller 220 may generate at least three fault codes such as Flag=0, Flag=1, and Flag=2 as fault codes to notify thermal abnormality of the battery of the specific vehicle (e.g., at S112).

For example, if it is determined that the temperature of the specific battery cell changes to a preset level or more by less than the preset number of times for a preset period of time (e.g., compared to the reference battery temperature distribution), the controller 220 may count the number of the warning temperatures of the specific battery cell and the number of the temperature sensor warning codes thereof. If the number of the temperature sensor warning codes of the specific battery cell exceeds a reference number of times (e.g., ten times or any other number of times) and the number of the warning temperatures exceeds a reference number of times (e.g., twenty times or any other number of times), the controller 220 may generate Flag-O as a fault code to notify the thermal abnormality of the battery of the specific vehicle.

If it is determined that the temperature of the specific battery cell of a specific vehicle changes to a preset level or more by the preset number of times or more for a present period of time (e.g., compared to the reference battery temperature distribution), the controller 220 may generate Flag=1 as a fault code to notify the thermal abnormality of the battery of the specific vehicle, for example, if the controller 220 counts the number of the fault temperatures of the specific battery cell and the number of the fault temperatures of the specific battery cell exceeds a first reference number of times (e.g., five times or any other number of times).

If it is determined that the temperature of the specific battery cell of a specific vehicle changes to a preset level or more by a preset number of times or more for a preset period of time (e.g., compared to the reference battery temperature distribution as described above), the controller 220 may count the number of the fault temperatures of the specific battery cell and the number of the temperature sensor fault codes thereof, and may generate Flag=2 as a fault code to notify the thermal abnormality of the battery of the specific vehicle, for example, if the number of temperature sensor fault codes of the specific battery cell exceeds a first reference number of times (e.g., ten times or any other number of times) and if the number of the fault temperatures exceeds a second reference number of times (e.g., twenty times or any other number of times).

Fault codes such as Flag=0, Flag=1, and Flag=2 generated by the controller 220 may be transmitted to the BMS 301 of the specific vehicle 300 (e.g., at S113).

The fault codes may be updated in the BMS 301 of the specific vehicle 300 which receives the fault codes (e.g., at S114).

For example, if the fault code of Flag=0 generated in the controller 220 is transmitted to the BMS 301 of the specific vehicle 300, the BMS 301 may update the fault code of Flag=0 to a fault code=0 and store the same. If the fault code of Flag=1 generated in the controller 220 is transmitted to the BMS 301 of the specific vehicle 300, the BMS 301 may update the fault code of Flag=1 to a fault code=1 and store the same. The fault code of Flag=2 generated in the controller 220 is transmitted to the BMS 301 of the specific vehicle 300, the BMS 301 may update the fault code of Flag=2 to a fault code=2 and store the same.

Hereinafter, after the fault code for the BMS 301 of the specific vehicle 300 is updated, a response procedure to the battery thermal abnormality of the specific vehicle will be described.

After the fault code is updated in the BMS 301 of the specific vehicle 300, following operations for addressing the thermal abnormality of a battery may be performed according to the updated fault code.

For example, if it is checked/determined that the fault code=2 indicating the thermal abnormality of a battery is updated in the BMS 301 of the specific vehicle 300 (e.g., at S115), the BMS 301 (or any other controller of the vehicle 300) may determine that there is a risk of thermal damage to the battery and fire, so the BMS 301 may display (e.g., via a display) a notification (e.g., an alarm) notifying the presence of the thermal abnormality of the battery mounted on the specific vehicle 300 and notifying the need of maintenance of the battery (e.g., at S116).

Accordingly, the driver of the vehicle 300 may be notified that the replacement of the battery mounted on the specific vehicle 300 and maintenance and the repair of the battery are recommended.

If it is checked that the fault code=1 indicating the thermal abnormality of a battery is updated in the BMS 301 of the specific vehicle 300 (e.g., at S117), the BMS 301 may display an inspection recommendation message for the battery mounted on the specific vehicle 300 (e.g., for a preventive inspection to prevent thermal damage to the battery) (e.g., at S118).

Accordingly, to prevent thermal damage to the battery mounted on the specific vehicle 300, the driver may be notified that a preventive maintenance is recommended.

If it is checked that the fault code=0 indicating the thermal abnormality of a battery is updated in the BMS 301 of the specific vehicle 300 (e.g., at S119), the fault code=0 may be stored (e.g., in a driving recorder to be checked during vehicle inspection in the future) although the thermal abnormality of the battery may not be serious (e.g., at S120).

Accordingly, if a mechanic checks the fault code=0 recorded in the driving recorder during vehicle inspection, an overall battery inspection can also be performed.

As described above, battery-related data may be collected from a plurality of vehicles 100 (e.g., hundreds to tens of thousands of mass-produced vehicles), and a reference battery temperature distribution may be derived by a learning process and a process of the collected battery-related data. The derived reference battery temperature distribution may be compared with the current battery temperature distribution of a specific vehicle 300 (e.g., a user's vehicle) and if a difference therebetween is a predetermined level or more, a battery mounted on the specific vehicle 300 may be diagnosed to have thermal abnormality. According to the result of the diagnosis, follow-up operations (e.g., analyzing the abnormality level and generating fault codes, which may notify the driver to perform the maintenance and/or repair of the battery, recommending the preventive maintenance of the battery, and recording the result of the diagnosis) may be easily performed.

Figure 6:
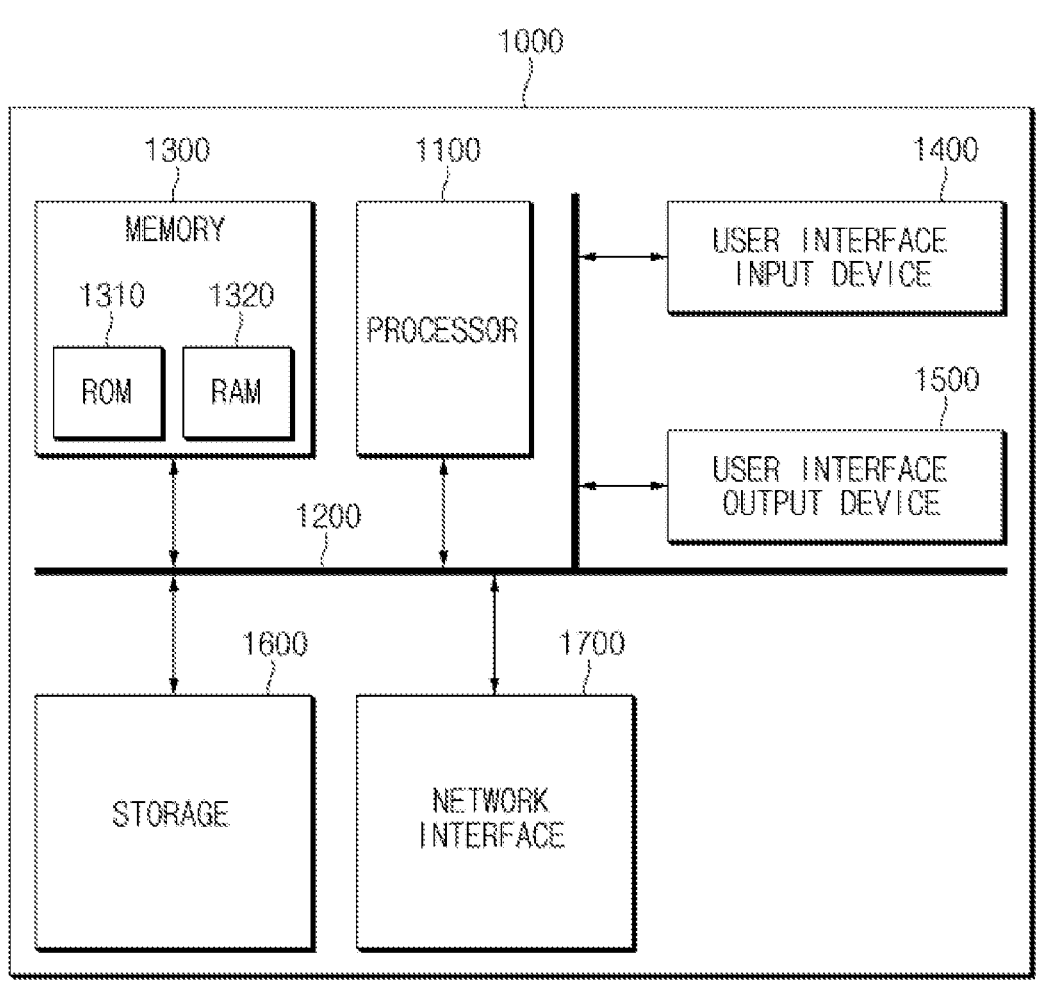
FIG. 6 is an example block diagram illustrating a computing system for executing a battery diagnosis method for a vehicle.

FIG. 6 is an example block diagram illustrating a computing system for executing a battery diagnosis method for a vehicle. Referring to FIG. 6, a battery diagnosis method for a vehicle may be implemented through a computing system. A computing system 1000 may include at least one processor 1100, a memory 1300, a user interface input device 1400, a user interface output device 1500, storage 1600, and/or a network interface 1700, which may be connected with each other through a system bus 1200. The computing system 1000 may be used to implement one or more devices, modules, components, and/or subcomponents as described in other figures.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a random access memory (RAM), a flash memory, a read only memory (ROM), an erasable and programmable ROM (EPROM), an electrically EPROM (EEPROM), a register, a magnetic storage device (e.g., a hard disk drive), a solid-state memory device (e.g., a solid-state drive (SSD)), a removable disc, and/or a compact disc-ROM (CD-ROM). For example, the storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

As described above, a system and method for diagnosing a vehicle battery may perform one or more operations. The system may use big data in which battery-related big data are collected through communication from multiple mass-produced vehicles. A reference battery temperature distribution for each driving condition may be derived by learning the collected battery-related big data. The derived reference battery temperature distribution may be compared with a current battery temperature distribution of a specific vehicle so as to diagnose whether the battery of the specific vehicle is abnormal.

A system for diagnosing a vehicle battery by using big data may include: BMSs of multiple mass-produced vehicles on which batteries are mounted; a BMS of a specific vehicle on which a battery is mounted; a big data server configured to derive a reference battery temperature distribution based on battery-related big data collected from the BMSs of the multiple mass-produced vehicles; and a controller configured to compare a current battery temperature distribution received from the BMS of the specific vehicle with the reference battery temperature distribution derived from the big data server and to transmit whether the battery of the specific vehicle has thermal abnormality according to a result of the comparison to the BMS of the specific vehicle.

The big data server may be configured to collect the battery-related big data from the BMSs of the multiple mass-produced vehicles, to extract factors affecting a battery temperature from the collected battery-related big data, to learn extracted factors such that the extracted factors affect the battery temperature for each actual driving condition, and to derive the reference battery temperature distribution of the battery in a normal state for each driving condition.

The controller may be configured to receive the current battery temperature distribution from the BMS of the specific vehicle, to compare the received current battery temperature distribution with the reference battery temperature distribution derived from the big data server, to generate multiple fault codes different from each other to notify whether the battery of the specific vehicle is thermally abnormal according to a result of the comparison, and to transmit the multiple fault codes to the BMS of the specific vehicle.

When it is determined that the reference battery temperature distribution and the current battery temperature distribution do not match with each other by having a temperature difference of a preset level or more therebetween, the controller may be configured to identify and store a thermally abnormal section of the battery of the specific vehicle in each battery cell in order to generate the fault codes, and to generate fault codes for a stored specific battery cell.

Additionally, when it is determined that a temperature of the specific battery cell changes to a preset level or more by less than a preset number of times for a preset period of time compared to the reference battery temperature distribution, the controller may be configured to count a number of warning temperatures of the specific battery cell and a number of the temperature sensor warning codes and to generate Flag=0 as a fault code to notify the thermal abnormality of the battery of the specific vehicle when the number of the temperature sensor warning codes of the specific battery cell exceeds a reference number of times and the number of warning temperatures exceeds the reference number of times.

When it is determined that a temperature of the specific battery cell changes to a preset level or more by a preset number of times or more for a preset period of time compared to the reference battery temperature distribution, the controller may be configured to count a number of fault temperatures of the specific battery cell and to generate Flag=1 as a fault code to notify the thermal abnormality of the battery of the specific vehicle when the number of the fault temperatures of the specific battery cell exceeds a first reference number of times.

When it is determined that a temperature of the specific battery cell changes to a preset level or more by a preset number of times or more for a preset period of time compared to the reference battery temperature distribution, the controller may be configured to count a number of fault temperatures of the specific battery cell and a number of temperature sensor fault codes thereof, and to generate Flag=2 as a fault code to notify the thermal abnormality of the battery of the specific vehicle when the number of the temperature sensor fault codes of the specific battery cell exceeds a reference number of times and the number of the fault temperatures exceeds a second reference number of times.

A method for diagnosing a vehicle battery by using big data may include: a step at which a big data server collects battery-related big data transmitted from BMSs of multiple mass-produced vehicles; a step at which the big data server derives a reference battery temperature distribution based on the collected battery-related big data; a step at which a controller receives a current battery temperature distribution transmitted from a BMS of a specific vehicle; a step at which the controller compares the current battery temperature distribution with the reference battery temperature distribution; generates a fault code which is a result of determination on whether a battery of the specific vehicle is thermally abnormal according to a result of the comparison; and transmits the fault code to the BMS of the specific vehicle; and a step at which the fault code is updated in the BMS of the specific vehicle receiving the fault code.

The reference battery temperature distribution may be obtained through a step of extracting factors affecting a battery temperature from the collected battery-related big data, and a step of learning the extracted factors such that the extracted factors affect the battery temperature for each actual driving condition.

The method may further include: a step of generating multiple fault codes different from each other for a stored specific battery cell after identifying and storing a thermally abnormal section of the battery of the specific vehicle in each battery cell when it is determined that the reference battery temperature distribution and the current battery temperature distribution are not in agreement with each other by having a temperature difference of a preset level or more.

When it is determined that a temperature of the specific battery cell changes to a preset level or more by less than a preset number of times for a preset period of time compared to the reference battery temperature distribution, a number of warning temperatures of the specific battery cell and a number of temperature sensor warning codes may be counted, and when the number of the temperature sensor warning codes of the specific battery cell exceeds a reference number of times and the number of the warning temperatures exceeds the reference number of times, Flag=0 as a fault code to be transmitted to the BMS of the specific vehicle may be generated.

Accordingly, when it is checked that fault code=0 indicating a thermal abnormality of a battery is updated in the BMS of the specific vehicle, a step of storing the fault code=0 in a driving recorder may be progressed.

When it is determined that a temperature of the specific battery cell changes to a preset level or more by a preset number of times or more for a preset period of time compared to the reference battery temperature distribution, a number of fault temperatures of the specific battery cell may be counted, and when the number of fault temperatures of the specific battery cell exceeds a first reference number of times, Flag=1 as a fault code to be transmitted to the BMS of the specific vehicle may be generated.

When it is checked that fault code=1 indicating a thermal abnormality of a battery is updated in the BMS of the specific vehicle, a step of displaying an inspection recommendation message for the battery mounted on the specific vehicle may be progressed through a cluster display.

When it is determined that a temperature of the specific battery cell changes to a preset level or more by a preset number of times or more for a preset period of time compared to the reference battery temperature distribution, a number of fault temperatures of the specific battery cell and a number of temperature sensor fault codes thereof may be counted, and when the number of the temperature sensor fault codes of the specific battery cell exceeds a reference number of times and the number of the fault temperatures exceeds a second reference number of times, Flag=2 as a fault code to be transmitted to the BMS of the specific vehicle may be generated.

When it is checked that fault code=2 indicating a thermal abnormality of a battery is updated in the BMS of the specific vehicle, a step of displaying an alarm notifying presence of the thermal abnormality of the battery mounted on the specific vehicle and notifying inducement of maintenance of the battery through a cluster display may be progressed.

Through the one or more features for solving the above problems, the present disclosure provides at least the following effects.

First, battery-related big data are collected from hundreds to tens of thousands of mass-produced vehicles; a reference battery temperature distribution is derived by learning the collected battery-related big data; the derived reference battery temperature distribution is compared with the current battery temperature distribution of a specific vehicle (a user's vehicle) and when a difference therebetween is a predetermined level or more, a battery mounted on the specific vehicle can be easily diagnosed to have thermal abnormality.

Second, the degree of thermal abnormality for each cell of a battery mounted on a specific vehicle is determined, and according to the degree of the determined thermal abnormality, a fault code, such as inducing the maintenance of a vehicle, recommending preventive maintenance of a vehicle, and recording the result of the diagnosis, is transmitted to the specific vehicle such that thermal damage to a battery and accidents can be prevented.

Although various examples of the present disclosure have been described above, the scope of the claims of the present disclosure is not limited to specific examples described herein, and various modifications and improvements may be made by those skilled in the art in view of the teachings of the present disclosure.

What is claimed is:

1. A system comprising:
   a server comprising at least one processor and a memory, the server configured to execute instructions stored in the memory using the at least one processor to:
      collect battery-related data from battery management systems (BMSs) of a plurality of vehicles via a wireless communication network; and
      derive a reference battery temperature distribution by performing a learning process based on the collected battery-related data, wherein the learning process comprises extracting one or more parameters affecting battery temperature for a plurality of actual driving conditions, wherein the learning process is performed based on training data comprising the extracted one or more parameters affecting battery temperature for each of the plurality of actual driving conditions, and wherein the reference battery temperature distribution comprises a reference battery temperature distribution for a normal battery state that is derived for each driving condition of a plurality of driving conditions; and
   a controller configured to:
      receive, from a battery management system (BMS) of a first vehicle via a vehicle communication device, a battery temperature distribution of a battery of the first vehicle;
      compare the received battery temperature distribution with the reference battery temperature distribution;
      determine, based on the comparison, whether a thermal abnormality is present in the battery of the first vehicle; and
      transmit, to the BMS of the first vehicle based on the determination of whether the thermal abnormality is present in the battery of the first vehicle, an indication indicating a presence or an absence of the thermal abnormality.

2. The system of claim 1, further comprising a communication device to receive the battery temperature distribution from the first vehicle,
   wherein the controller is further configured to generate, based on the determination of whether the thermal abnormality is present in the battery of the first vehicle, a plurality of fault codes to indicate whether the battery of the first vehicle is thermally abnormal, and to transmit the plurality of fault codes to the first vehicle.

3. The system of claim 2, wherein the controller is further configured to identify, based on a result of comparing the battery temperature distribution received from the first vehicle with the reference battery temperature distribution, a thermally abnormal section of the battery of the first vehicle, and to generate, based on the thermally abnormal section, fault codes associated with a battery cell of the first vehicle.

4. The system of claim 3, wherein based on a temperature of the battery cell satisfying a first condition, the controller is further configured to count a number of warning temperatures associated with the battery cell and a number of temperature sensor warning codes, and to generate a first flag as a fault code to indicate the thermal abnormality.

5. The system of claim 3, wherein based on a temperature of the battery cell satisfying a second condition different from a first condition, the controller is further configured to count a number of fault temperatures associated with the battery cell and to generate, based on the number of fault temperatures satisfying a first threshold, a second flag, different from a first flag, as a fault code to indicate the thermal abnormality.

6. The system of claim 3, wherein based on a temperature of the battery cell satisfying a second condition different from a first condition, the controller is configured to count a number of fault temperatures associated with the battery cell and a number of temperature sensor fault codes associated with the battery cell, and to generate, based on the number of fault temperatures satisfying a second threshold different from a first threshold and the number of temperature sensor fault codes satisfying a third threshold, a third flag, different from first and second flags, as a fault code to indicate the thermal abnormality.

7. A method comprising:

receiving, by a server from battery management systems (BMSs) of a plurality of vehicles via a wireless communication network, battery-related data;

deriving, by the server based on the received battery-related data, a reference battery temperature distribution by performing a learning process, wherein the learning process comprises extracting one or more parameters affecting battery temperature for a plurality of actual driving conditions, wherein the learning process is performed based on training data comprising the extracted one or more parameters affecting battery temperature for each of the plurality of actual driving conditions, and wherein the reference battery temperature distribution comprises a reference battery temperature distribution for a normal battery state that is derived for each driving condition of a plurality of driving conditions;

receiving, by a controller from a battery management system (BMS) of a first vehicle via a vehicle communication device, a battery temperature distribution of a battery of the first vehicle;

comparing, by the controller, the battery temperature distribution of the battery of the first vehicle with the reference battery temperature distribution;

determining, based on the comparing, whether the battery of the first vehicle is thermally abnormal;

generating, by the controller based on the determination of whether the battery of the first vehicle is thermally abnormal, a fault code indicating whether the battery of the first vehicle is thermally abnormal; and transmitting, by the controller, the fault code to the BMS of the first vehicle.

8. The method of claim 7, further comprising:

generating, based on a result of the comparing the battery temperature distribution of the battery of the first vehicle with the reference battery temperature distribution, a plurality of fault codes for a battery cell of the first vehicle after identifying a thermally abnormal section of the battery of the first vehicle.

9. The method of claim 8, further comprising: based on a temperature of the battery cell satisfying a first condition:

counting a number of warning temperatures associated with the battery cell and a number of temperature sensor warning codes; and generating a first flag as a fault code to be transmitted to the first vehicle.

10. The method of claim 8, further comprising: based on a temperature of the battery cell satisfying a second condition different from a first condition:

counting a number of fault temperatures associated with the battery cell; and generating, based on the number of fault temperatures satisfying a first threshold, a second flag, different from a first flag, as a fault code to be transmitted to the first vehicle.

11. The method of claim 8, further comprising: based on a temperature of the battery cell satisfying a second condition different from a first condition:

counting a number of fault temperatures associated with the battery cell and a number of temperature sensor fault codes associated with the battery cell; and generating, based on the number of fault temperatures satisfying a second threshold different from a first threshold and the number of temperature sensor fault codes satisfying a third threshold, a third flag, different from first and second flags, as a fault code to be transmitted to the first vehicle.

12. The method of claim 7, wherein the performing of the learning process comprises performing, based on thermodynamic and electrochemical properties of batteries and using at least one of a time series data-based algorithm or a recurrent neural network (RNN)-based algorithm, the learning process.

13. The system of claim 1, wherein the server is configured to execute the instructions stored in the memory using the at least one processor to perform, based on thermodynamic and electrochemical properties of batteries and using at least one of a time series data-based algorithm or a recurrent neural network (RNN)-based algorithm, the learning process.

14. The system of claim 1, wherein the derived reference battery temperature distribution comprises:

a first reference battery temperature distribution for a normal battery state that is derived for a first driving condition of the plurality of driving conditions; and a second reference battery temperature distribution for a normal battery state that is derived for a second driving condition of the plurality of driving conditions.

15. The system of claim 1, wherein the server is configured to execute the instructions using the at least one processor to:

input, in an input layer of a learning model, the extracted one or more parameters affecting battery temperature;

perform, based on the extracted one or more parameters affecting battery temperature and via a hidden layer of the learning model, a learning process to determine the reference battery temperature distribution for a normal battery state that is derived for each driving condition of the plurality of driving conditions; and output, via an output layer of the learning model, a learning result indicating the reference battery temperature distribution for a normal battery state that is derived for each driving condition of the plurality of driving conditions.

16. The method of claim 7, wherein the derived reference battery temperature distribution comprises:

a first reference battery temperature distribution for a normal battery state that is derived for a first driving condition of the plurality of driving conditions; and a second reference battery temperature distribution for a normal battery state that is derived for a second driving condition of the plurality of driving conditions.

17. The method of claim 7, further comprising:

inputting, in an input layer of a learning model, the extracted one or more parameters affecting battery temperature;

performing, based on the extracted one or more parameters affecting battery temperature and via a hidden layer of the learning model, a learning process to determine the reference battery temperature distribution for a normal battery state that is derived for each driving condition of the plurality of driving conditions; and outputting, via an output layer of the learning model, a learning result indicating the reference battery temperature distribution for a normal battery state that is derived for each driving condition of the plurality of driving conditions.

* * * * *